United States Patent
Shirrell et al.

(10) Patent No.: US 6,942,909 B2
(45) Date of Patent: Sep. 13, 2005

(54) WRAPPING FILMS WITH MATING CLING STRIPS

(75) Inventors: Jack N. Shirrell, Wadsworth, IL (US);
Patrick T. Rigney, Allentown, PA (US); Eldrige J. Presnell, Round Lake Beach, IL (US); Jeffrey G. Kellermann, Arlington Heights, IL (US); Christopher Brunning, Spalding (GB); Xavier J. Maka, Charency-Vezin (FR); Guy L. Rosenthal, Wheaton, IL (US); Chad D. Broussard, Orange, TX (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/354,448

(22) Filed: Jan. 30, 2003

(65) Prior Publication Data

US 2004/0151853 A1 Aug. 5, 2004

(51) Int. Cl.$^7$ ................................................ B32B 27/32
(52) U.S. Cl. .................. 428/35.7; 428/36.3; 428/36.91; 428/189; 428/222; 428/516; 428/218; 428/355 EN
(58) Field of Search ................................ 428/35.7, 36.3, 428/36.91, 189, 218, 222, 355 EN, 516

(56) References Cited

U.S. PATENT DOCUMENTS

| | | | |
|---|---|---|---|
| 4,518,654 A | 5/1985 | Eichbauer et al. | |
| 4,820,589 A | 4/1989 | Dobreski et al. | |
| 4,833,017 A | 5/1989 | Benoit | |
| 4,996,094 A | 2/1991 | Dutt | |
| 5,175,049 A | 12/1992 | Huff et al. | |
| 5,208,096 A | 5/1993 | Dohrer | |
| 5,948,493 A | 9/1999 | Groeger | |
| 5,998,017 A | 12/1999 | Eichbauer | |
| 6,132,827 A | * 10/2000 | Miro | 428/35.9 |
| 6,265,055 B1 | * 7/2001 | Simpson et al. | 428/213 |
| 6,420,022 B2 | 7/2002 | Bonke et al. | |
| 6,492,010 B1 | * 12/2002 | Karaoglu et al. | 428/213 |
| 2001/0014401 A1 | 8/2001 | Bonke et al. | |
| 2002/0050124 A1 | 5/2002 | Jaeger | |
| 2004/0121108 A1 | * 6/2004 | Mass et al. | 428/57 |

FOREIGN PATENT DOCUMENTS

| | | |
|---|---|---|
| EP | 0 287 272 A2 | 10/1988 |
| EP | 0 317 166 A2 | 5/1989 |
| WO | WO 91/17944 | 11/1991 |
| WO | WO 96/29203 | 9/1996 |

* cited by examiner

Primary Examiner—Sandra M. Nolan-Rayford
(74) Attorney, Agent, or Firm—Pauley Petersen & Erickson

(57) ABSTRACT

A cling film system includes first and second film piles having different composition. Each film ply includes at least one cling layer and, desirably, one or more additional layers. Each film ply includes an overlapping portion and a second portion. The cling layer of the first film ply engages the cling layer of the second film ply in the overlapping portion of the first film ply and in the overlapping portion of the second film ply.

29 Claims, 3 Drawing Sheets

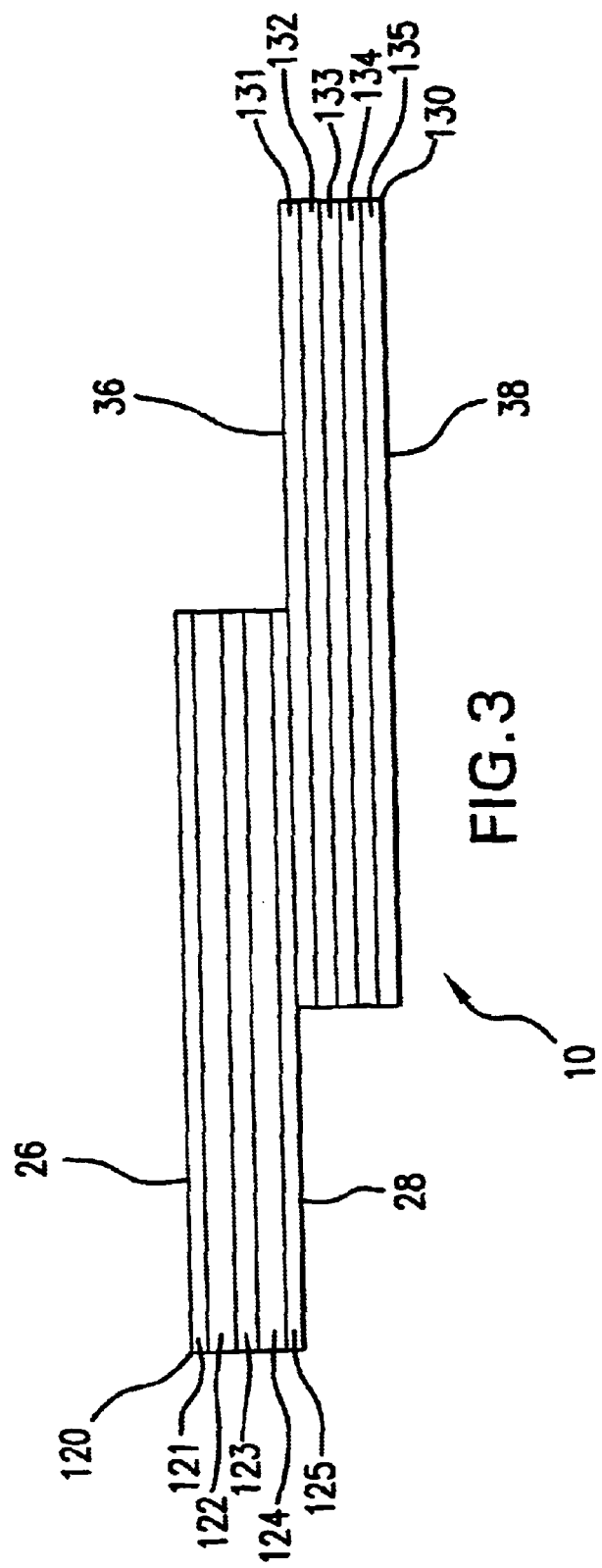

WRAPPING FILMS WITH MATING CLING STRIPS

FIELD OF THE INVENTION

This invention is directed to an improved cling film system, useful for wrapping steel coils and other articles in a spiral fashion.

BACKGROUND OF THE INVENTION

Various single layer and multiple layer cling films have been used for wrapping steel coils and other articles. Cling films are typically based on polyethylene homopolymers or copolymers including, without limitation, low density polyethylene, linear low density polyethylene, ethylene vinyl acetate and the like. In addition to the polymer components, these films typically include a balance of additives which are intended to improve cling, and additives employed for other purposes which may have an undesirable anti-cling effect.

A cling film must have the ability to stick or cling to itself, or to other films having the same composition. One conventional cling film is based on linear low density polyethylene modified with a cling additive, such as polyisobutylene, a volatile corrosion inhibitor, such as sodium nitrite, as well as other chemicals described below that bloom to the surface and deposit on the steel surface to inhibit corrosion. The corrosion inhibiting chemicals tend to diminish or eliminate the cling of the linear low density polyethylene film. The polyisobutylene restores the cling to the film, so that the film will cling or stick to itself during wrapping of an article.

Multiple layer films have also been developed, having very high cling properties in an outer facing layer of the film and corrosion inhibiting additives in an inner facing layer. The corrosion inhibiting additives can thus readily migrate to the article being wrapped. The very high cling properties of the outer facing layer tend to offset the low cling properties of the inner facing layer, so that the two surfaces adequately cling together during wrapping.

Other cling films include volatile corrosion inhibitors applied as a coating in stripes or other spaced apart patterns. The areas on the film away from the stripes are devoid of these additives, allowing opposing film surfaces to cling together during wrapping. These cling films are relatively complex and expensive to manufacture.

Another difficulty encountered with prior cling films (both single layer and multi-layer) is that they may puncture and tear when exposed to the sharp edges of steel coils or other articles being wrapped. Thus, there is a need or desire for a cling film system which a) provides improved cling properties while aiding corrosion resistance, b) is relatively inexpensive to manufacture, and c) has improved toughness and puncture resistance.

SUMMARY OF THE INVENTION

The present invention is directed to a cling film system including at least two plies. The first ply has a first surface and a second surface, the second ply has a first surface and a second surface, and the second surface of the first ply faces and partially overlaps the first surface of the second ply. The first ply and the second ply may have different compositions from each other. The second surface of the first ply and the first surface of the second ply have cling properties.

The first ply and second ply may be formed separately, as separate films, and brought together before or during wrapping of the article so that the second surface of the first ply partially overlaps the first surface of the second ply. The first ply and the second ply may each have a single layer, or multiple layers, and need not have the same number of layers. The first ply and the second ply may each be formed by cast or blown film extrusion or coextrusion, and need not be formed by the same process.

In one embodiment, the second ply includes at least a first surface layer and a second surface layer. The first layer of the second ply (which faces the second layer of the first ply) is a cling layer which provides cling properties. The second layer of the second ply includes one or more corrosion inhibitors, and has relatively less or no cling compared to the first layer of the second ply. In a further embodiment, the first ply also includes at least a first surface layer and a second surface layer. The second layer of the first ply is a cling layer which provides cling properties. The first layer of the first ply may have less or no cling properties compared to the second layer of the first ply.

In addition to the first and second surface layers described above, the first ply and/or the second ply may include one or more core layers which do not have an exposed surface. The core layer(s) may be structural layer(s) which provide added strength to the first and/or second ply of the cling film system. The core layer(s) may also be relatively low cost bulk layers which reduce the overall material cost of the first and/or second ply.

During wrapping of an article, the first and second plies of the cling film system are applied to the article in a partially overlapping fashion so that the highest cling (second) surface of the first ply engages the highest cling (first) surface of the second ply, causing the engaged regions of the two plies to cling together particularly well. Desirably, the second surface of the first ply includes at least one region engaging the first surface of the second ply, and at least one adjacent region not engaging the same first surface of the second ply. Desirably, the first surface of the second ply includes at least one region engaging the second surface of the first ply, and at least one region not engaging the same second surface of the first ply. While heat may be applied to facilitate bonding, no heat is required to cause the first and second plies to cling together in the overlapping regions.

The cling film system may desirably be wrapped around an article in a spiral or undulating fashion, so that the same continuous cling film system passes around the article as a first wrap, second wrap, third wrap, etc., around the article. The second wrap of the cling film system around the article partially overlaps the first wrap, the third wrap partially overlaps the second wrap, and so on. Again, the first and second plies of the cling film system partially overlap so that the highest cling (second) surface of the first ply of a particular wrap (e.g. the second wrap) engages the highest cling (first) surface of the second ply of the same (e.g. second) wrap. The second surface of the first ply includes a region engaging the first surface of the second ply of the same (e.g. second) wrap, and a region not engaging the same first surface of the second ply of the same wrap, the latter engaging the first surface of the second ply of the immediately preceding (e.g. first) wrap. The first surface of the second ply of the same (e.g. second) wrap includes a region engaging the second surface of the first ply of the same wrap, and a region not engaging the second surface of the first ply of the same wrap, the latter engaging the second surface of the first ply of the next subsequent (e.g. third) wrap.

With the foregoing in mind, it is a feature and advantage of the invention to provide an improved cling film system which provides improved cling properties as well as corrosion resistance, is relatively inexpensive to manufacture, and provides improved toughness and puncture resistance.

BRIEF DESCRIPTION OF THE DRAWINGS

FIG. 3 is a side view of one preferred embodiment of a cling film system.

DETAILED DESCRIPTION OF THE PRESENTLY PREFERRED EMBODIMENTS

Figure 1:
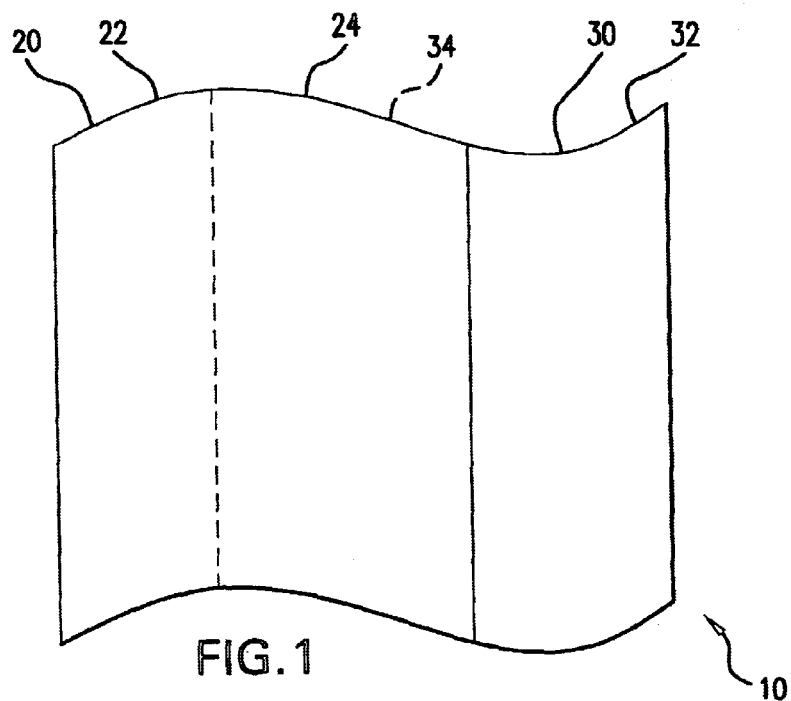
FIG. 1 is a top plan view of a cling film system according to the invention.

Referring to FIG. 1, a cling film system 10 of the invention includes a first ply 20 and a second ply 30. The first ply 20 includes a non-overlapping portion 22 and an overlapping portion 24 which overlaps with the second ply. The second ply 30 includes a non-overlapping portion 32 and an overlapping portion 34 which overlaps with the first ply. For purposes of this invention, the term "ply" refers to a separately formed film. The first and second plies 20 and 30 may be formed using separate extrusion lines, or may be formed at different times using the same extrusion line, or may be formed simultaneously on the same extrusion line at different positions on the bubble or web. The extrusion line(s) may be blown film, cast film, or one of each.

The overlapping portions 24 and 34 represent the area over which the first ply 20 and the second ply 30 are joined and cling together. The overlapping portions 24 and 34 should have a width of about 2–86 inches, suitably about 5–27 inches. Each overlapping portion should constitute about 40–95 percent of the width of the respective ply, desirably about 60–90 percent of the width of the respective ply.

Figure 2:
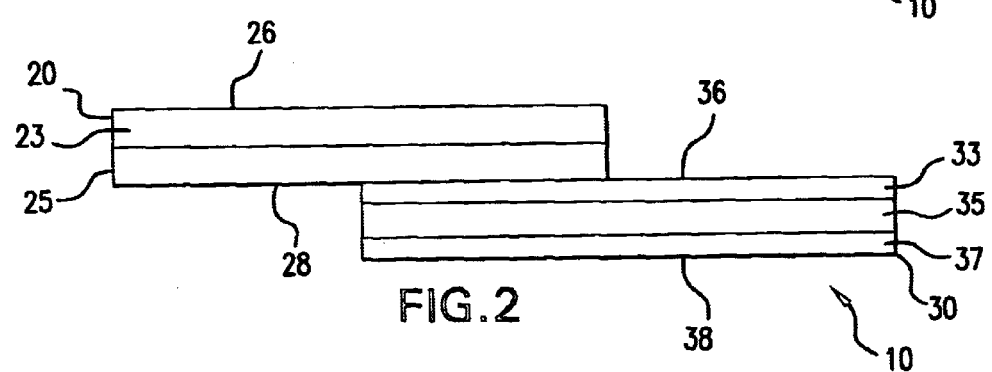
FIG. 2 is a side view of a first embodiment of a cling film system according to FIG. 1.

Referring to FIG. 2, the first ply 20 has a first surface 26 which does not engage the second ply 30, and a second surface 28 which engages the second ply 30 over part of its area. The second surface 28 is a cling surface. For purposes of this invention, the term "cling surface" is defined as a surface with cling of at least 100 grams to itself, when measured using unstretched film according to ASTM D5458. The second ply 30 has a first surface 36 which is a cling surface, and a second surface 38 which can be a non-cling surface. The first surface 36 engages the first ply 20 over part of its area.

In the embodiment of FIG. 2, the second "cling" surface 28 of the first ply 20 includes an entire inner side of the first ply 20, and only a portion of surface 28 of first ply 20 engages second ply 30. Similarly, the first "cling" surface 36 of second ply 30 includes an entire outer side of second ply 36, and only a portion of surface 36 engages first ply 20.

The first ply 20 may be composed of a single layer, formed of a cling material. Alternatively, the first ply 20 may include two or more layers, provided that the layer which provides the second "cling" surface 28 is formed of a cling material. In the embodiment of FIG. 2, the first ply 20 includes two layers 23 and 25 coextruded together. The layer 23, which has no contact with the second ply 30, may be a cling layer (i.e. a layer which provides a "cling surface" as defined above) or desirably a non-cling layer (i.e. a layer which does not provide a "cling surface" as defined above).

For instance, the layer 23 may be a non-cling layer which includes slip additives, antiblock additives, or the like which impart non-cling properties, in addition to an olefin homopolymer or copolymer. The polymer used in the non-cling layer 23 may be low density polyethylene, linear low density polyethylene, or high density polyethylene having a density of about 0.910–0.965 grams/cm$^3$, desirably about 0.925–0.945 grams/cm$^3$, or a combination thereof. This ethylene polymer may have a melt index (190° C., ASTM D1238) of about 0.05–10 grams/10 min, desirably about 0.5–3.5 grams/10 min. When the polymer is linear low density polyethylene, the alpha-olefin comonomer may have 3–12 carbons, desirably 4–8 carbons. The polymer may also be a polypropylene homopolymer or propylene-ethylene copolymer containing less than about 10% by weight ethylene, having a density of about 0.875–0.900 grams/cm$^3$, or a combination thereof. The propylene polymer may have a melt flow rate (230° C., ASTM D1238) of about 0.5–15 grams/10 min, desirably about 2–10 grams/10 min. The polymer(s) used in the non-cling layer 23 may be prepared using a Ziegler-Natta catalyst, a single-site (e.g. metallocene) catalyst, or a chromium catalyst. In addition to slip and/or antiblock additives, the layer 23 may include stabilizers, catalyst neutralizers, process aids, ultraviolet inhibitors and blockers, colorants, antistatic agents and other special purpose additives.

The second layer 25 of first ply 20 in FIG. 2 is a cling layer. A cling layer is any layer having a cling surface as defined above. Cling layers may include an ethylene-alpha olefin copolymer plastomer, wherein the alpha-olefin has 3–12 carbons, desirably 4–8 carbons. Suitable plastomers have a density of about 0.850–0.890 grams/cm$^3$, and typically have a higher content of alpha-olefin comonomer than linear low density polyethylene. Suitable plastomers have a melt index (190° C., ASTM D1238) of about 0.1–10 grams/ 10 min., desirably about 0.6–6.0 grams/10 min. Suitable plastomers may be prepared using a single-site (e.g. metallocene) catalyst, and may also be prepared using a Ziegler-Natta or chromium catalyst. The plastomer may be used alone in the cling layer 25, or in combination with linear low density polyethylene and/or low density polyethylene, either having a density of about 0.891–0.925 grams/cm$^3$. Other polymers useful in cling layers, which may be used alone or in combination with a plastomer, include ethylene-vinyl acetate, ethylene methyl acrylate, ethylene ethyl acrylate, ethylene-propylene copolymers (especially those containing 10–90% by weight ethylene and 10–90% by weight propylene), and polyethylene homopolymers and copolymers blended with polyisobutylene, as well as combinations of the foregoing. Cling layers are preferably devoid of migratory additives, volatile corrosion inhibitors and other anti-cling materials, but may include stabilizers, antioxidants, catalyst neutralizers, processing aids and the like. In the embodiment of FIG. 2, at least the second layer 25 of first ply 20 is a cling layer. The first layer 23 may be a cling layer or a non-cling layer, as described above. Where cling and non-cling layers are employed, the cling layer should constitute about 5–20% of the ply thickness, desirably about 5–10% of the ply thickness.

In the embodiment of FIG. 2, the second ply 30 includes three layers 33, 35 and 37 coextruded together. The first layer 33 provides the first surface 36 which is a cling surface. Thus, the first layer 33 is a cling layer, and may have the same composition or range of compositions described above for the cling layer 25 of the first ply 20 in FIG. 2. The first layer 33 may constitute about 5–20% of the total thickness of the second ply 30, desirably about 5–10% of the total thickness.

The second layer 35 of the second ply 30 is a core layer in the embodiment of FIG. 2, and has no exposed surface. The second layer 35 need not have cling properties, and desirably includes a structural and/or bulk (cost saving) polymer or polymer combination. Suitable polymers for the second layer 35 include low density polyethylene, linear low density polyethylene or high density polyethylene having a density of about 0.910–0.965 grams/cm$^3$, desirably about 0.910–0.945 grams/cm$^3$, or a combination thereof. This ethylene polymer may have a melt index (190° C., ASTM D1238) of about 0.05–10 grams/10 min., desirably about 0.5–3.5 grams/10 min. The polymer may also be a polypropylene homopolymer or propylene-ethylene copolymer containing up to about 10% by weight ethylene, having a density of about 0.875–0.900 grams/cm$^3$, or a combination thereof. The propylene polymer may have a melt flow rate (230° C., ASTM D1238) of about 0.5–15 grams/10 min., desirably about 2–10 grams/10 min. The second layer 35 may also include stabilizers, catalyst neutralizers, and other conventional additives. Layer 35 may also contain one or more migrating volatile corrosion inhibitors, and may act as a reservoir which allows these additives to slowly migrate to the wrapped article to prevent corrosion. The second layer 35 may constitute about 5–90% of the total thickness of the second ply 30, desirably about 60–90% of the total thickness.

The third layer 37 of the second ply 30 is a surface layer which faces the article being wrapped. The third layer 37 may be a non-cling layer and may be based on polymers the same or similar to those described for the second (core) layer 35. Additionally, the third layer 37 may be a corrosion-inhibiting layer which contains about 0.5–20% by weight of one or more volatile corrosion inhibitors, desirably in master batches whose active ingredients migrate toward the article and provide corrosion resistance. When present in a master batch, the volatile corrosion inhibitor master batch desirably constitutes about 0.5–15% by weight of the third layer 37. The third layer 37 may constitute about 5–90% of the total thickness of the second ply 30, desirably about 5–10% of the thickness.

The desired amount of volatile corrosion inhibitor depends on the amount of corrosion resistance needed and the type of volatile corrosion inhibitor used. Suitable volatile corrosion inhibitors include inorganic nitrites, molybdates, carbonates, nitrogen-containing organic compounds, and combinations thereof. Examples include sodium nitrite, dicyclohexylamine, monocyclohexylamine, triamines, triazoles such as benzotriazole and tolytriazole, combinations of organic amines and salts of weak volatile acids, and other combinations of the foregoing.

Various other modifications in the number of layers in each ply, the layer thicknesses, and the number of plies are considered to be within the scope of this invention. For instance, the first and second plies 20 and 30 may each contain two layers, may each contain three layers, may each contain four layers, or either or both may contain any number of layers which is most suitable for the application. More than two plies desirably having different compositions may also be employed in the cling film system. Any two plies are considered to have different compositions if any layer in the first ply has a different composition and/or thickness than a corresponding layer in the second ply, with layers counted from the top down in both plies, and/or if the two plies have different numbers of layers. The total thickness of each ply may vary depending on the end use. Each ply may have a total thickness of about 5–250 microns, suitably about 8–125 microns, desirably about 15–50 microns.

In one embodiment, a three-ply structure may be provided in which the first and second (outer) plies have facing cling layers and a third ply provided between them is a reinforcing mesh or scrim that need not have cling properties. The mesh or scrim has large enough openings that the first and second plies can interface and cling to each other through the openings in the third ply. The third ply provides added strength, and does not impede the stretching of the first and second plies due to the flexibility of the mesh or scrim structure.

FIG. 3 illustrates a preferred embodiment of the cling film system 10 in which the first ply 120 and the second ply 130 each have five layers. The first ply 120 includes layers 121, 122, 123, 124 and 125. The second ply 130 includes layers 131, 132, 133, 134 and 135. The first layer 121 of the first ply 120 is a non-cling skin layer which may be formed from any of the non-cling polymers described above. In one embodiment, the layer 121 is formed of DOWLEX 2027A from the Dow Chemical Co. This polymer is a linear medium density polyethylene having a density of about 0.941 grams/cm$^3$ and a melt index of about 4.0. This polymer is an ethylene-octene copolymer prepared using a Ziegler-Natta catalyst. The layer 121 preferably constitutes about 10% of the thickness of the ply 120.

The second and fourth layers 122 and 124 of the first ply 120 are sub-skin layers which may be formed of polymers having high strength. These polymers may be non-cling polymers. Non-cling polymers as described above, yet which are formed using single-site catalysts, are particularly suitable. In one embodiment, the layers 122 and 124 are formed using EXCEED 3518 from the Exxon-Mobil Chemical Co. This polymer has a density of about 0.918 grams/cm$^3$ and a melt index of about 3.5. This polymer is an ethylene-hexene copolymer prepared using a metallocene catalyst. Layers 122 and 124 preferably each constitute about 20% of the thickness of the first ply 120.

The third (middle) layer of the first ply 120 may be formed using any of the non-cling polymers described above. In one embodiment, the layer 123 is formed using DOWLEX HSE-1003 from the Dow Chemical Co. This polymer is a linear low density polyethylene having a density of about 0.918 grams/cm$^3$ and a melt index of 2.3. This polymer is an ethylene-hexene copolymer prepared using a Ziegler-Natta catalyst. The third layer 123 preferably constitutes about 40% of the thickness of the first ply 120.

The fifth layer 125 of the first ply 120 is a cling skin layer. The layer 125 may be formed using any of the cling polymers described above. In one embodiment, the layer 125 is formed using AFFINITY KC8852 from the Dow Chemical Co. This polymer is an ethylene-octene copolymer plastomer having a density of about 0.875 grams/cm$^3$ and a melt index of about 3.0, and is prepared using a constrained geometry single-site catalyst. The fifth layer 125 preferably constitutes about 10% of the thickness of the first ply 120.

Each of the layers 121–125 may include ingredients in addition to the stated polymers. Other ingredients may include stabilizers, catalyst neutralizers, recycled edge trim, and other polymers and ingredients in amounts that do not impair or overcome the functions and purposes of each of the layers.

The first layer 131 of the second ply 130 is a cling skin layer which may be formed using any of the cling polymers described above. In one embodiment, the layer 131 is formed using AFFINITY KC8852 from the Dow Chemical Co. The first layer 131 preferably constitutes about 10% of the thickness of the second ply 130.

The second and fourth layers 132 and 134 of the second ply 130 are sub-skin layers which may be formed of polymers having high strength. These polymers may be non-cling polymers. Non-cling polymers as described above, yet which are formed using single-site catalysts, are particularly suitable. In one embodiment, the layers 132 and 134 are formed using EXCEED 3518 from the Exxon-Mobil Chemical Co. Layers 132 and 134 preferably each constitute about 20% of the thickness of the second ply 130.

The third (middle) layer 133 of the second ply 130 may be formed using any of the non-cling polymers described above. In one embodiment, the layer 133 is formed using DOWLEX HSE-1003 from the Dow Chemical Co. The third layer 133 preferably constitutes about 40% of the thickness of the second ply 130.

The fifth layer 135 of the second ply 130 is a non-cling skin layer. Layer 135 may be formed using any of the non-cling polymers described above, and may also include a volatile corrosion inhibitor as described above. In one embodiment, skin layer 135 is formed using DOWLEX 2027A from the Dow Chemical Co. Desirably, the skin layer includes 94 percent by weight DOWLEX 2027A blended with 6 percent by weight of a volatile corrosion inhibitor masterbatch. The components may be dry blended before or upon entering the extruder. The layer 135 preferably constitutes about 10% of the thickness of the second ply 130.

Each of the layers 131–135 may include ingredients in addition to the stated polymers. Other ingredients may include stabilizers, catalyst neutralizers, recycled edge trim, and other polymers and ingredients in amounts that do not impair or overcome the functions and purposes of each of the layers.

The first and second plies 20, 120 and 30, 130 shown in the cling film system of FIGS. 2 and 3 may be independently prepared using any suitable film-forming technique including cast film coextrusion, blown film coextrusion, or a combination of both, as well as other techniques. Each ply is extruded as an elongated film strip having a width in the horizontal direction of the drawings, a thickness in the vertical direction of the drawings, and a length which may be substantially endless, in the direction perpendicular to the drawings. After extrusion, the separate plies 20 and 30, or 120 and 130 may be joined together in overlapping fashion as shown in FIGS. 2 and 3, either before or during wrapping. For instance, the first and second plies may be joined together as shown and stored on the same wound-up roll for subsequent use. The joining of the plies may be accomplished by passing the plies 20 and 30, or 120 and 130, with overlapping portions between nip rollers at room temperature (50–130° F.) or under heat. Alternatively, the first and second plies may be stored on separate wound-up rolls, and later joined during wrapping of an article.

A wide variety of articles may be wrapped using the cling film system 10 of the invention. Examples of articles to be wrapped include without limitation steel coils and other metal objects, rows and skids of plastic bottles and other items, large bundles of extruded pieces, and the like. Where the article or package of articles to be wrapped is large, long and/or tall, it is desirable to apply the first and second plies in an alternating, desirably spiral (undulating) pattern of first ply, second ply, first ply, second ply and so on, until the article or package is completely covered.

Figure 2A:
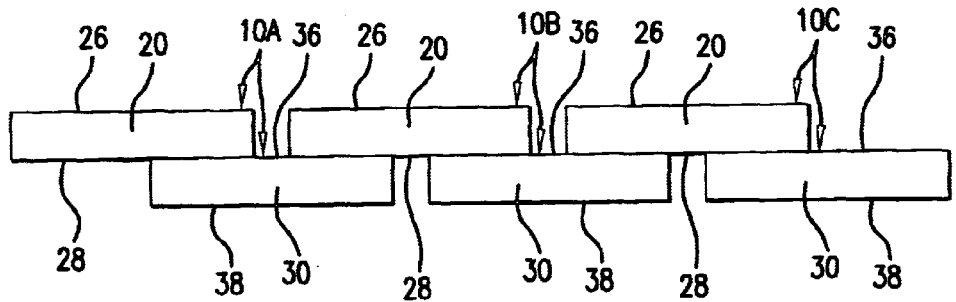
FIG. 2(a) schematically illustrates in section, how the cling film system of FIG. 2 may appear when wrapped onto an article or package of articles.

Referring to FIG. 2(a), there are various ways to achieve the alternating pattern of first ply 20, second ply 30, first ply 20, second ply 30 and so on, along the length or width of an article or package. One way, which is generally preferred, is to wrap a single pair of cling film plies 20 and 30 having a continuous or very long length, around the article or package in a spiral or undulating fashion. The spiral or undulating pattern is preferred because it eliminates the need to seal multiple pairs of plies, i.e., the single pair need only be sealed at both ends. The mating cling surfaces of the first ply 20 and second ply 30 are generally capable of clinging to each other at normal room or storage or processing temperatures of about 50–130° F., desirably about 60–90° F. If desired, heat may be applied to reinforce the seals at temperatures below or up to about 250° F., so as to soften the mating layers of the first and second plies without melting them.

The alternating arrangement of first and second plies in FIG. 2(a) would result from the use of the cling film system 10 shown in FIG. 2. FIG. 2(a) shows a schematic sectional view of a continuous cling film as it may appear on one surface of an article that has been wrapped in a spiral (undulating) fashion. The same continuous cling film system 10 passes around the article as a first wrap or undulation 10A, a second wrap or undulation 10B, a third wrap or undulation 10C, and so on. The second wrap 10B of the cling film system around the article partially overlaps the first wrap 10A, and the third wrap 10C partially overlaps the second wrap 10B. Each of the wraps 10A, 10B, 10C and so on, includes a section of the first ply 20 and a section of the second ply 30. Again, the first and second plies of the cling film system partially overlap so that the highest cling (second) surface 28 of the first ply 20 of a particular wrap (e.g. the second wrap 10B) engages the highest cling (first) surface 36 of the second ply of the same (e.g. second) wrap. The second surface 28 of the first ply includes a region engaging the first surface 36 of the second ply of the same (e.g. second) wrap, and a region not engaging the same first surface of the second ply of the same wrap, the latter engaging the first surface 36 of the second ply of the immediately preceding wrap (e.g. the first wrap 10A). The first surface 36 of the second ply of the same (e.g. second) wrap includes a region engaging the second surface 28 of the first ply of the same (e.g. second) wrap, and a region not engaging the second surface of the first ply of the same wrap, the latter engaging the second surface 28 of the first ply of the next subsequent wrap (e.g. the third wrap 10C).

Figure 4:
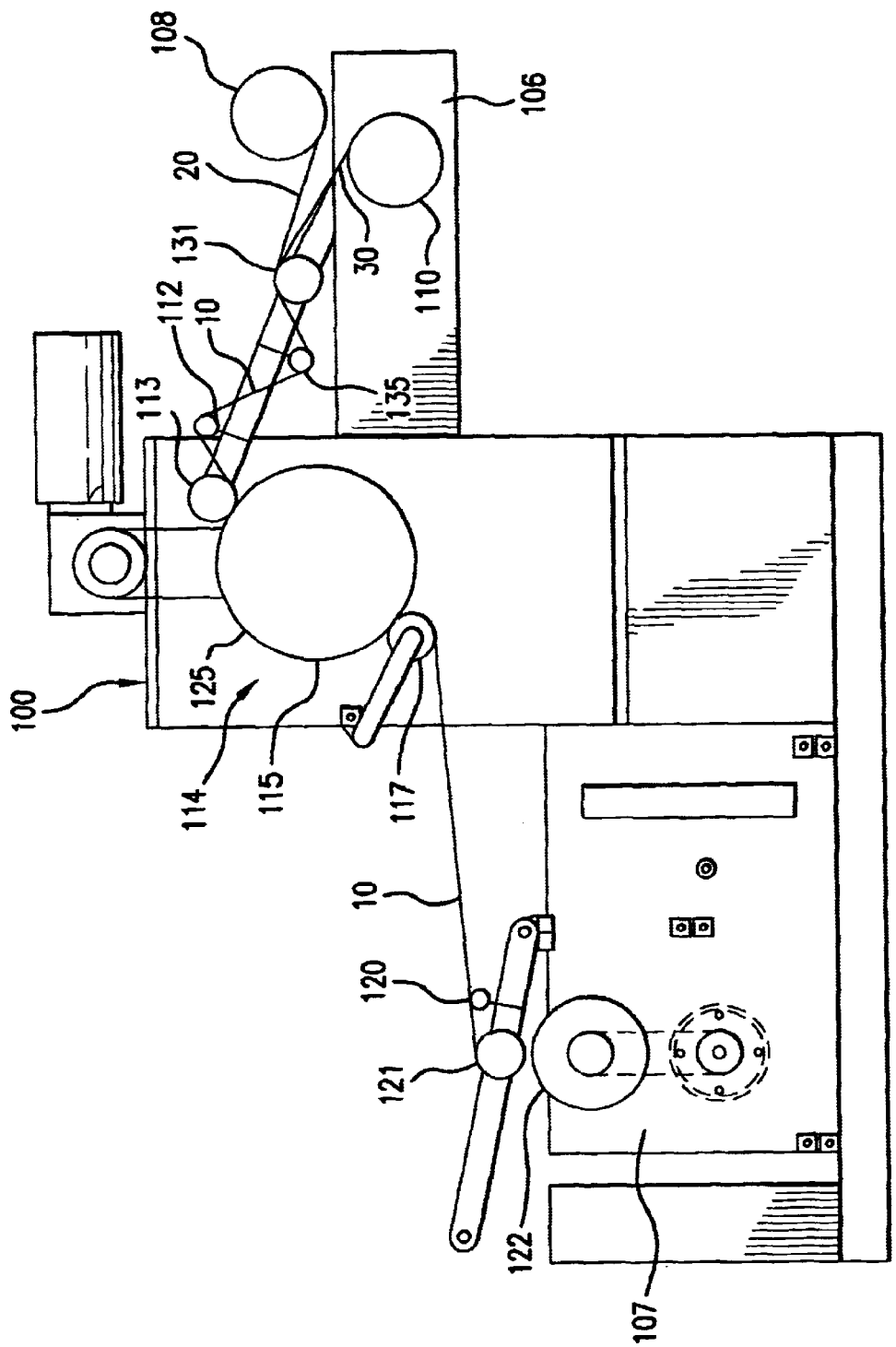
FIG. 4 schematically illustrates a process useful for joining two plies of the cling film system together.

FIG. 4 schematically illustrates an apparatus that can be used to unwind and join the first and second plies 20 and 30 of the cling film system 10, in a partially overlapping fashion. First ply 20 may be supplied from roll 108 or an extruder, and second ply 30 may be supplied from roll 110 or an extruder, with one or both rolls mounted with respect to an inlet frame 106. First ply 20 and second ply 30 are combined so that they partially overlap, and the combined cling film system 10 is passed over rollers 131, 135 and 112 under tension. The cling film system 10 is passed between a first nip defined by small roller 113 and large roller 115, and a second nip defined by large roller 115 and small roller 117, the rollers 113, 115 and 117 being mounted to a master frame 114. Surface 125 of roller 115 may be unheated, or may be heated to below the melting temperature of the adjacent contact layer of cling film system 10. The cling film system 10 then passes over guide rollers 120 and 121, and can be wound on a core held in place on shaft 107 during winding, and then stored in roll form on roll 122.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

We claim:

1. A cling film system, comprising:
   a first film ply including at least one cling layer; and
   a second film ply including at least one cling layer;
   each of the first and second film plies including a first overlapping portion where the first and second film plies overlap and a second non-overlapping portion where the first and second film plies do not overlap;
   the cling layer of the first film ply engaging the cling layer of the second film ply in the overlapping portion of the first film ply and in the overlapping portion of the second film ply;
   wherein the overlapping portions have a width of about 5–86 inches and extend along a length of each film ply.

2. The cling film system of claim 1, wherein the first film ply and the second film ply have different compositions.

3. The cling film system of claim 1, wherein the cling layer in the first film ply comprises a polymer selected from ethylene-alpha olefin copolymer plastomers, ethylene vinyl acetate, ethylene methyl acrylate, ethylene ethyl acrylate, ethylene-propylene copolymers including about 10–90% by weight each of ethylene and propylene, polyisobutylene, blends of the foregoing with linear low density polyethylene, and combinations thereof.

4. The cling film system of claim 3, wherein the cling layer in the first ply comprises an ethylene-alpha olefin copolymer plastomer having a density of about 0.85–0.89 grams/cm$^3$.

5. The cling film system of claim 1, wherein the cling layer in the second film ply comprises a polymer selected from ethylene-alpha olefin copolymer plastomers, ethylene vinyl acetate, ethylene methyl acrylate, ethylene ethyl acrylate, ethylene-propylene copolymers including about 10–90% by weight each of ethylene and propylene, polyisobutylene, blends of the foregoing with linear low density polyethylene, and combinations thereof.

6. The cling film system of claim 5, wherein the cling layer in the second film ply comprises an ethylene-alpha olefin copolymer plastomer having a density of about 0.85–0.89 grams/cm$^3$.

7. The cling film system of claim 1, wherein the first film ply further comprises a non-cling layer.

8. The cling film system of claim 7, wherein the non-cling layer in the first film ply comprises a polymer selected from low density polyethylene, linear low density polyethylene, high density polyethylene, polypropylene, propylene-ethylene copolymers including less than about 10% by weight ethylene, and combinations thereof.

9. The cling film system of claim 1, wherein the second film ply further comprises a non-cling layer.

10. The cling film system of claim 9, wherein the non-cling layer in the second film ply comprises a polymer selected from low density polyethylene, linear low density polyethylene, high density polyethylene, polypropylene, propylene-ethylene copolymers including less than about 10% by weight ethylene, and combinations thereof.

11. The cling film system of claim 9, wherein the non-cling layer in the second film ply comprises a volatile corrosion inhibitor.

12. A cling film system, comprising:
    a first multilayer film ply including a cling layer; and
    a second multilayer film ply including a cling layer and a corrosion-inhibiting layer;
    each of the first and second film plies including a first overlapping portion where the first and second film plies overlap and a second non-overlapping portion where the first and second film plies do not overlap;
    the cling layer of the first film ply engaging the cling layer of the second film ply in the overlapping portion of the first film ply and in the overlapping portion of the second film ply;
    wherein the overlapping portions constitute about 40–95% of a width of the first film ply and about 40–95% of a width of the second film ply.

13. The cling film system of claim 12, wherein each of the first and second film plies includes only two layers.

14. The cling film system of claim 12, wherein one of the first and second film plies includes three layers.

15. The cling film system of claim 12, wherein each of the first and second film plies includes three layers.

16. The cling film system of claim 12, wherein one of the first and second film plies includes four layers.

17. The cling film system of claim 12, wherein each of the first and second film plies includes four layers.

18. The cling film system of claim 12, wherein one of the first and second film plies includes five layers.

19. The cling film system of claim 12, wherein each of the first and second film plies includes five layers.

20. The cling film system of claim 12, wherein the cling layer in the first film ply comprises a polymer selected from ethylene-alpha olefin copolymer plastomers, ethylene vinyl acetate, ethylene methyl acrylate, ethylene ethyl acrylate, ethylene-propylene copolymers including about 10–90% by weight each of ethylene and propylene, polyisobutylene, blends of the foregoing with linear low density polyethylene, and combinations thereof.

21. The cling film system of claim 20, wherein the cling layer in the first ply comprises an ethylene-alpha olefin copolymer plastomer having a density of about 0.85–0.89 grams/cm$^3$.

22. The cling film system of claim 12, wherein the cling layer in the second film ply comprises a polymer selected from ethylene-alpha olefin copolymer plastomers, ethylene vinyl acetate, ethylene methyl acrylate, ethylene ethyl acrylate, ethylene-propylene copolymers including about 10–90% by weight each of ethylene and propylene, polyisobutylene, blends of the foregoing with linear low density polyethylene, and combinations thereof.

23. The cling film system of claim 22, wherein the cling layer in the second film ply comprises an ethylene-alpha olefin copolymer plastomer having a density of about 0.85–0.89 grams/cm$^3$.

24. The cling film system of claim 12, wherein the corrosion-inhibiting layer in the second film ply comprises a polymer selected from low density polyethylene, linear low density polyethylene, high density polyethylene, polypropylene, propylene-ethylene copolymers including less than about 10% by weight ethylene, and combinations thereof.

25. The cling film system of claim 24, wherein the corrosion-inhibiting inhibiting layer in the second film ply further comprises a volatile corrosion inhibitor selected from inorganic nitrites, molybdates, carbonates, nitrogen-containing organic compounds, and combinations thereof.

26. The cling film system of claim 25, wherein the volatile corrosion inhibitor comprises a compound selected from sodium nitrite, dicyclohexylamine, monocyclohexylamine, triamines, triazoles, and combinations thereof.

27. The cling film system of claim 25, wherein the volatile corrosion inhibitor comprises sodium nitrite.

28. A wrapped article or package, comprising:

one or more articles; and a wrapper including a cling film system;

the cling film system including a first film ply including a cling layer and a second film ply including a cling layer;

each of the first and second film plies including a first overlapping portion where the first and second film plies overlap and a second non-overlapping portion where the first and second film plies do not overlap;

the cling layer of the first film ply engaging the cling layer of the second film ply in the overlapping portion of the first film ply and in the overlapping portion of the second film ply;

the wrapper including an alternating sequence of first and second film plies;

wherein the overlapping portions constitute about 40–95% of a width of the first film ply and about 40–95% of a width of the second film ply.

29. The wrapped article of claim 26, wherein the wrapper comprises the cling film system arranged in a spiral or undulating fashion.

* * * * *

UNITED STATES PATENT AND TRADEMARK OFFICE
CERTIFICATE OF CORRECTION

PATENT NO.     : 6,942,909 B2
DATED          : September 13, 2005
INVENTOR(S)    : Jack N. Shirrell et al.

It is certified that error appears in the above-identified patent and that said Letters Patent is hereby corrected as shown below:

Column 12,
Line 8, replace "Claim 26" with -- Claim 28 --.

Signed and Sealed this

Twenty-seventh Day of December, 2005

JON W. DUDAS
*Director of the United States Patent and Trademark Office*